United States Patent [19]
Mednikow

[11] 3,771,747
[45] Nov. 13, 1973

[54] AIRCRAFT-LANDING STRIP DEVICE

[76] Inventor: Leon Mednikow, 290 9th Ave., New York, N.Y. 10001

[22] Filed: July 1, 1971

[21] Appl. No.: 158,893

[52] U.S. Cl............................................. 244/114 R
[51] Int. Cl............................................... B64f 1/00
[58] Field of Search.................... 244/114 R, 110 R, 244/63, 110 E

[56] References Cited
UNITED STATES PATENTS

| | | | |
|---|---|---|---|
| 3,544,044 | 12/1970 | Stahmer........................... | 244/114 R |
| 2,355,948 | 8/1944 | Bonstow et al. ................. | 244/114 R |
| 2,522,667 | 9/1950 | De Land........................... | 244/114 R |
| 1,796,693 | 3/1931 | Schimmel......................... | 244/114 R |
| R15,758 | 2/1924 | Gibbons............................ | 244/110 E |
| 1,478,747 | 12/1923 | Kinyoun............................ | 244/110 E |

FOREIGN PATENTS OR APPLICATIONS

| | | | |
|---|---|---|---|
| 243,982 | 7/1960 | Australia.......................... | 244/114 R |
| 1,164,245 | 2/1964 | Germany.......................... | 244/114 R |
| 543,833 | 5/1956 | Italy.................................. | 244/114 R |
| 1,263,980 | 5/1961 | France............................. | 244/114 R |
| 592,363 | 5/1959 | Italy.................................. | 244/114 R |

Primary Examiner—Trygve M. Blix
Assistant Examiner—Paul E. Sauberer
Attorney—Polachek & Saulsbury

[57] ABSTRACT

A turntable air-strip having a series of aligned variable speed surfaces for facilitating take-off and landings of aircraft, together with a series of blowers and a series of baffles aligned along the series of variable speed air strip surfaces such that the blowers and baffles are produceable of air currents further facilitatable of take-off and landings of aircraft by directing the air current in the path and/or against lift surfaces of the aircraft, such as an airplane particularly of the jet plane variety.

5 Claims, 5 Drawing Figures

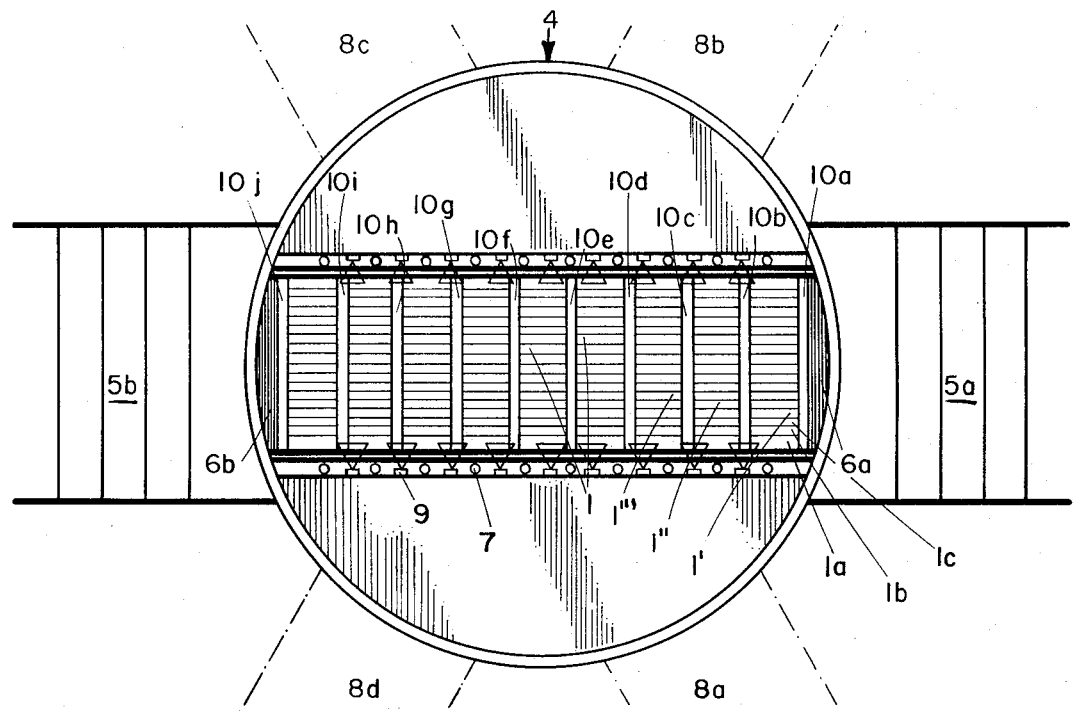
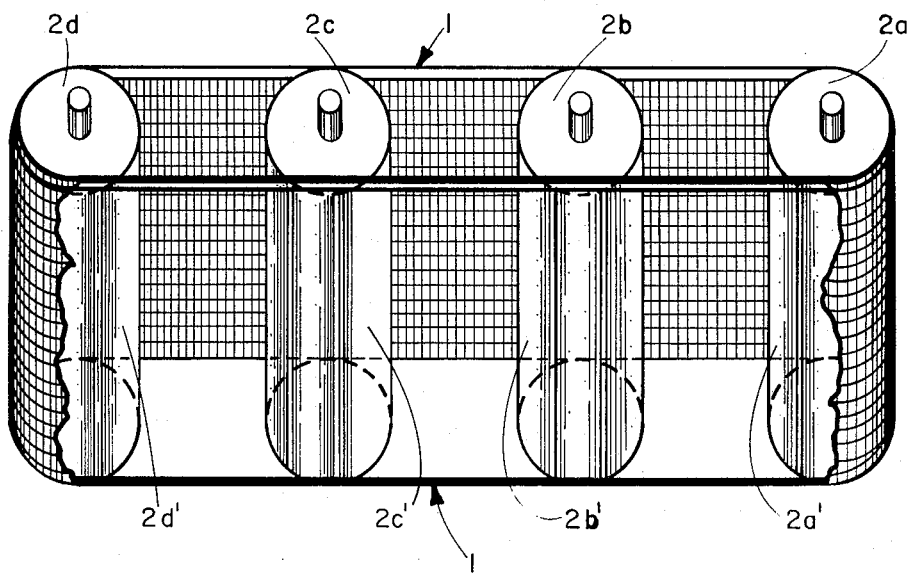

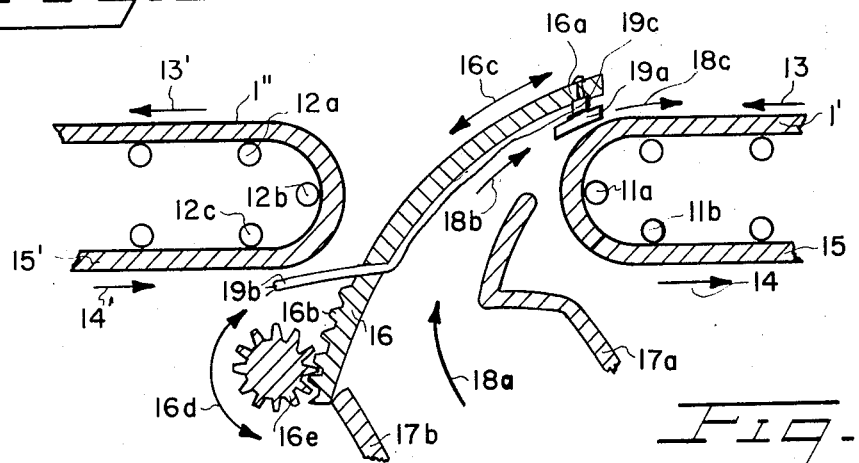
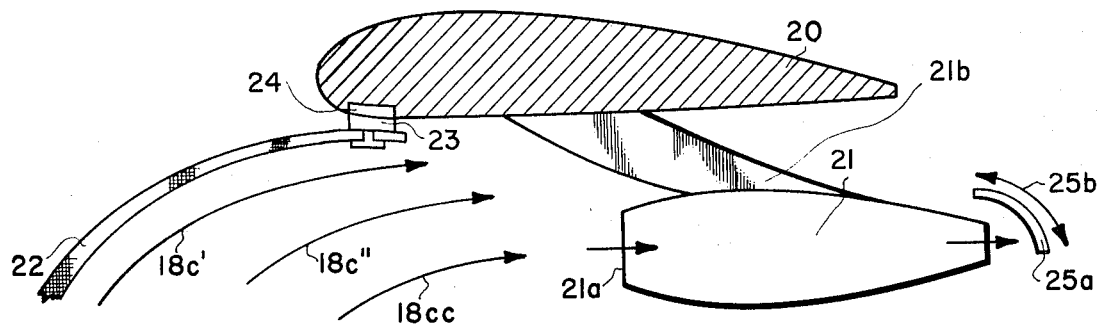
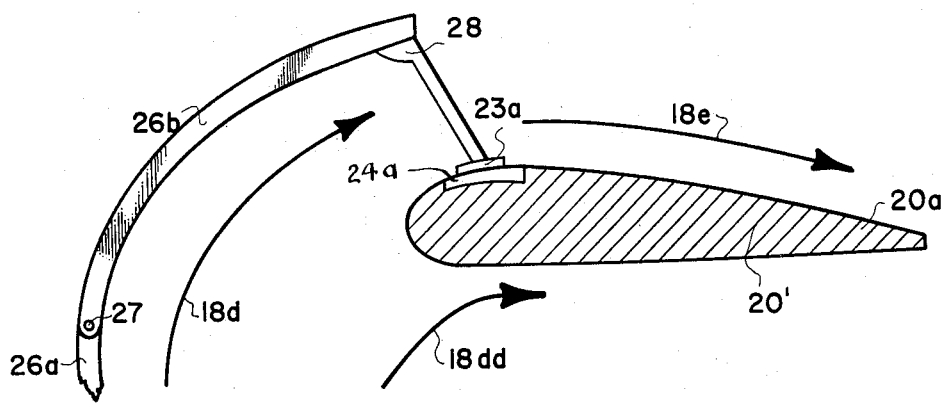
INVENTOR.
LEON MEDNIKOW

AIRCRAFT-LANDING STRIP DEVICE

This invention relates to means for reducing the necessary length of an air strip necessary for the landing and/or take-off high speed aircraft in particular, and also eliminating the necessity of the extended runways in more than a single direction.

BACKGROUND

Prior to this invention there have been various means suggested for facilitating the take-off and/or landing of aircraft on a sirface or from a surface of reduced length. Typical is the U. S. Pat. No. 3,085,772 in which a rotatable turntable has a movable surface of rollers which theoretically enables a plane to gather greater momentum while standing in substantially a stationary position as a result of the moving rollers moving in a direction toward which the plane is propelling itself. Other patents directed to the same sort of theories include typically U.S. Pat. No. 1,681,474, U.S. Pat. No. 1,291,668, U.S. Pat. No. 2,375,449, U.S. Pat. No. 1,803,507, and the like. However, each of these patents share a common fallacy in regard both to take off and to landing situations. For example, in take-off, a great to-do is made in these patents about the advantages in take-off such as described briefly above, whereas when considered in terms of actual results, no greater advantage is achieved by the moving belts, rollers, chains, or the like in maintaining the plane in a substantially stationary position than would be gained by anchoring the plane by means of releasable lock anchor or tying means and/or braking means which prevent the plane from leaving a stationary position merely as a result of the plane being tied down, until such time as the propellers, jets, or other propulsion device has built up sufficient intensity of rotation or propulsion that release of the brakes and/or other tying or anchoring means permits the plane immediately to surge forward, there being also catapult devices which assist in the forward surging of the plane. Similarly, as to the common fallacy of purported benefits of such chains, belts, or other similar devices in the landing of the aircraft, they are similarly of limited value as a result of the fact that the forward motion of the plane is not in the least reduced until such time that the tires or wheels of the plane are in braking contact with the landing surface irrespective as to whether it is moving or stationary and that if the moving surface were moving at too great a speed toward the plane, there would be a great tendency to cause the plane actually to flip over or to nose-over and crash. Each of the aforementioned patents as well as other literature on such devices appears to completely ignore this danger and does not provide any adequate solution therefor.

SUMMARY OF THE INVENTION

Objects of this invention include the overcoming of difficulties and problems associated with the devices of the aforementioned types as well as the gaining of additional novel advantages. Other objects become apparent from the preceding and following disclosure. One or more objects of this invention are successfully obtained by the applicant's novel invention.

Broadly speaking, any one or more of the prior art belts, chain systems, or other conventional or suggested or desired types may be employed as a part of the Applicant's invention such as for example those discussed above. However, in the applicant's invention, there is a series of consecutive moving surfaces of variable speeds and during any particular take-off and/or landing the speed of any particular belt and/or of different belts or rollers of the series thereof vary in their rates of speed such that when, for example, braking wheels of an aircraft during a landing touch-down the landing surface belt, chains or the like are actually preferably about stationary or moving only slightly in a direction opposite to that of the approaching aircraft but rapidly begin increasing in intensity and/or the next adjacent belt of the series is of increased rate of speed of movement toward the approaching aircraft, for example, such that a counter movement against the braking wheels is not so sudden as to cause the aircraft to nose over. However, in addition to these mechanisms as thus described, there is in combination a series of consecutive blowers and respective baffles for directing the air currents from the blowers at predetermined prescribed angles variable from one angle to another during the approach of the aircraft such that prior to the touch-down of the wheels of the aircraft the air currents directed counter to the direction of movement of the aircraft and against the lift surfaces of the aircraft and the forward faces of the aircraft serve to reduce the speed of the aircraft relative to a stationary ground point thereby serving the equivalent of the airplane passing through a longer span of air over a longer distance as measured by a stationary point on the ground or landing strip. The blowers, not shown, have means, not shown, actuated to vary the direction of the airstream produced by the blowers from a horizontal direction to about an upward vertical direction in a vertical plane, and in a horizontal direction 90° to each side of the longitudinal centerline of the landing surface, in a horizontal plane. Similarly, during take-off the air currents may be directed against the leading surfaces of the aircraft as well as against and/or over lift surfaces of the wings such as to have the effect of the plane passing through longer distances of air space whereas in fact the plane has been reduced considerably in its forward motion and speed relative to a stationary point on the ground or the air strip. In a manner similar to that described for the variable speed of the movable air strip, the forward-most blowers and baffles direct air currents of substantially reduced intensity and velocity in order not to throw the aircraft out of control, but any one or more of the blowers and baffles may jointly serve to rapidly increase the intensity and/or the succeeding consecutive ones of the series of blowers and baffles directing the air currents rapidly increase in the intensity and directness of the air currents against leading surfaces and/or lift surfaces of the aircraft such as to rapidly bring the aircraft to a relatively stationary position over the landing strip immediately prior to and/or during touch-down, whereby the blowers and baffles are coordinated in function with the moving air-strip surfaces. As the aircraft touches down, the remaining blowers located such as for the remaining baffles to continue to direct air currents against the aircraft gradually become reduced in the intensity and lifting direction of the air currents directed in the path of and against the aircraft while concurrently the speed of the moving surfaces against the wheels also are reduced in their velocity as the plane gradually rolls to a standstill relative to the moving surfaces and the moving air currents. Accordingly, this invention coordinates the directing of air currents into the path of and against aircraft during landing approaches and touch-downs coordinated with the variable speed landing surfaces against which the aircraft's wheels are able to brake. Similarly in take-off, the blowers and baffles gradually increase in the intensity of the air currents and in the directness of the air currents against the aircraft such as to contribute to lift and such as to serve as the equivalent of the plane moving through air space at a greater speed whereby the aircraft may be flying at a high rate of velocity relative to the air currents while still remaining substantially stationary relative to a stationary point on the ground or on the air strip such that when the air currents are directed such as to give the aircraft a final lift and/or boost, the aircraft already airborne surges forward with little or no loss of lift or altitude.

The inventive combination is preferably automatic and preferably includes two or more conventional or desired radar transmitters or receivers located on opposite sides of the movable landing strip(s) such that the optimum speed(s) of the moving surface(s) and the optimum direction and intensities of air currents may be automatically calculated by preferably an interconnected computer and the computer automatically and/or operator manually may initiate the movements, directions, and intensities. Additionally, to further facilitate instantaneous and responsive changes and/or alterations in the direction baffle(s) upwardly, forwardly, or sidewardly, and the forward, reverse, and/or varying rates of movement of the landing strip surface(s), a series of consecutive electric eyes preferably may be mounted on one and/or opposite side(s) of the runway landing strip(s) on and/or off the turntable. Such radar transmitter(s) and/or electric eye(s) may be mounted on or adjacent to the airstrip lights and/or fire-extinguisher(s) and/or elsewhere as may be desired with the preferred automatic control by way of radar, electric, and computer tied in as a control to the movable strip(s), baffles, blowers, rate(s) and direction(s) and intensities of movement; the take-off and landing operations using conventional and/or known computer, radar, electric eye and control systems can be substantially fully automatic.

THE FIGURES

FIG. 1 illustrates an elevation plan view of a rotatable turntable having a series of consecutive aligned separately movable air strips typically of the type as might be desired and as described in the patents discussed above, with the rotatable turntable being rotatable to align the series of strips with any particular runway of an available plurality of runways diverging from the turntable in different directions. Also illustrated at each end of the series of movable landing-strip surfaces and between the adjacent consecutive movable landing-strips of the series are located baffle means for directing air currents from blowers located therebeneath.

FIG. 2 represents graphically a suitable arrangement for a single one of the revolvable landing-strips capable of moving the upper landing surface in optionally either direction depending upon the direction of rotation of the wheels or rollers on which the conveyor belt is being rotated.

FIG. 3 illustrates both a preferred and different embodiment of the conveyor belt landing-strip surfaces and rollers, in a typical side view thereof in the nature of a cross-section and also illustrating between two consecutive conveyor belts each shown in-part a typical retractable baffle means continuous with outlet walls of a blower means.

FIG. 4a graphically represents another variation and additional improvement of the present invention in which during take-off, as shown graphically in a side view cross-section, air currents are channeled upwardly beneath a flexible barrier attached to the wing by a detachable means such as electromagnetic means, for directing air currents against the lower lift surface of an aircraft wing and into the intake or jet motor.

FIG. 4b is a variation of the embodiment of FIG. 4a, also shown graphically in typically a cross-sectional side view, of a detachable pivoted baffle attached to an airplane wing surface detachably for directing air currents over the wing surface during a take-off operation.

DETAILED DESCRIPTION OF THE INVENTION

The invention may be more fully understood by reference to the various figures as follows.

FIG. 1 illustrates an elevation plan view of a typical preferred embodiment of the invention in which the turntable 4 has mounted thereon a series of consecutive separately movable conveyor belt surfaces such as 1', 1'', 1''', and the like. Although conveyor belts of strong fibers such as steel mesh together with possibly glass fiber, synthetic fibers, or the like or any other conventional or desired suitable meshes, chains, rollers and the like, such as disclosed in the above-discussed patents. Between the consecutive movable surfaces such as 1', 1'', 1''', and the like are located transverse (cross-wise) of the strip 1 are the baffle plates 10a, 10b, 10c, 10d, 10e, 10f, 10g, 10h, 10i, 10j, which serve to channel air currents from blowers substantially beneath the turntable face, normally beneath the moving surfaces. Aligned along opposite parallel edges of the strip 1 are a series of landing-strip lights 9 and in a preferred embodiment thus illustrated also a series of fireextinguishers 7. At opposite ends of the air-strip 1 are located preferably a stationary steel supplement to the air-strip 1. In a preferred embodiment, the surfaces 1', 1'', 1''', and the like are rubberized or otherwise coated or treated so as to reduce shock and so as to provide suitable gripping surfaces for the tires of landing aircraft braking to a stop. Each of the separate conveyors such as 1', for example, may be a single continuous conveyor or as illustrated may be a series of side by side conveyor belts 1a, 1b, 1c, and the like. In the illustrated embodiment of FIG. 1, there is disclosed a continuous runway consisting of the turntable air-strip 1 with separate diverging strips 5b and 5a diverging in opposite directions; additionally however, as illustrated there may be and preferably are other diverging strips such as 8a, 8b, 8c, 8d, and the like.

FIG. 2 illustrates a diagrammatic perspective view of a single conveyor belt roller system illustrating a series of roller cylinders for revolvably rotating the landing-strip 1. The landing-strip 1 on the upper surface is shown in cut-away in order to better illustrate the cylinders 2a', 2b', 2c', 2d' therebeneath with the ends of the cylinders being represented by 2a, 2b, 2c, 2d, each with their respective axes 27a, b,c,d, for receiving drive belts, driving chains, gears, or the like.

FIG. 3 illustrates a diagrammatic side view shown in part of two consecutive conveyor belt drive systems with the respective conveyor belts 1' and 2' with the intermediate baffle plate 16 movably controlled by the action of gear 16e on the toothed surface 16b of the arced baffle 16 having its terminal end 16a as a continuation of the arc such that by controlling the rotary motion and/or the locked position of the gear 16e the baffle 16 may be positioned such that the terminal end 16a directs air currents 18a, 18b and 18c being channeled between the blower walls 17a and 17b into any desired predetermined and variable direction such as 18c. Additionally there is mounted near the terminal end 16a a pivoted additional baffle for directing the air currents 18b and 18c either leftward or rightwardly or straight ahead as may be desired. It is understood that there would be a series of such additional baffles 19a aligned along the edge 16a the entire transverse length of the landing-strips 1', 1'', 1''' etc. Also illustrated is an electric motor 19c controlled by powering control line 19b. In this particular embodiment of FIG. 3, there are illustrated preferred arrangements of rollers making it more practical for the consecutive conveyor belts 1' and 1'' to be close together to avoid wide spaces between the belts while concurrently providing sufficient space for the arced baffle plate to be cranked up into any desired position. For example the belt 1' is moving in directions 13 and 14 on rollers or cylinders 11a and 11b at the terminal ends where the major direction change takes place and also for the belt 1'' the major changes of direction are on the rollers or cylinders 12a, 12b, and 12c, with the belt 1'' moving in direction 13' and 14' the lower portion of belt 1' being designated 15 and the lower portion of belt 1'' being designated 15'. The direction of movement of the baffle plate responsive to the action of the gear 16e is indicated by directional movements 16c.

FIG. 4A illustrates a diagrammatic cross-sectional side view of an aircraft wing 20 with its jet motor 21 supported by support 21b having intake 21a and a variably movable baffle 25a movable variably in directions 25b —this being conventional in present day jet aircraft systems where an extra amount of lift is desired, and illustrating the air currents as directed against a baffle 22 attached by its metallic and/or magnetic member 23 to electromagnet 24 ( or permanent magnet) such that the currents 18c', 18c'', and 18cc are directed against lift surfaces of the underside of the wing 20 and/or through the jet intake 21a.

FIG. 4B is more or less analagous to that of FIG. 4A except that in FIG. 4B there is illustrated a different type of baffle 26b of a more rigid variety with an axis 27 for pivotable movement of the member 26b on the member 26a when the wing 20' moves in a forward and/or upward direction such as during a take-off operation. Additionally illustrated are the air currents 18d which are directed over the wing to create a lift by virtue of air currents 18e passing the upper wing surface 20a, as well as the pressure air currents 18d having a pressure lifting action on the underside of the wing 20'. The magnetic or metallic member 23a is held securely to the wing by permanent or electromagnet 24a, the member being detachable either by switching off the current to the electromagnet or by the twisting action of the member 23a as the plane moves forward to pull away from the baffle 26b.

The materials out of which the various baffle plates or baffle members may be made may vary from plastic to metal or fabric or combinations of these materials, or any other desired and/or conventional materials suiting the purposes within the broad scope of this invention. Similarly, although various embodiments are illustrated, the illustrated embodiments serve solely to clarify the understanding of the broad invention and are not intended to unduly limit the scope of the invention.

It is to be understood also that the baffle plates and blowers although illustrated as directing the air currents between consecutive moving conveyor belts may also direct the air currents through meshed surfaces of the conveyor belts themselves together with the intermediate baffles or in substitution therefor, so long as such mechanisms as may be desired are within the scope of the invention as described herein.

As stated above, each of the conveyor belts may be controlled to operate at any of variable speeds as may be desired or needed for a particular situation or may be permanently set at predetermined speeds, and may be such as to be optionally directable in opposite directions of rotation of the conveyor belt. During any particular take-off or landing operation not only may the speed of a single conveyor belt be varied and/or reversed but in conjunction with the adjacent belt, the adjacent belt may be of a different speed and/or direction as might be suitable.

The particular desirable utility of the baffle plates such as baffle plate 19a of FIG. 3 is that the direction of the air currents sideward or straightforward may be controlled in situations such as when it is desired to have the landing-strip 1 in alignment with the approach path of the aircraft but insofar as wind directions prevailing it is nevertheless desirable to have the air currents directed either straightforward or alternatively (as the case may be) in one or the other sideward direction to one degree or another to counteract drift. Although it is true that there are optional diverging air-strips available, nevertheless it is not practical to have so many air-strips as to eliminate the need for some method of cntrolling drift to some extent since the increasing numbers of diverging air-strips significantly increases the cost of airport construction, a primary purpose of this invention being to reduce such costs as well as the need for extended runways in any direction.

Any suitable motors whether gasoline driven, diesel, electric, or the like may be employed as the drive means for driving any one or more of the conveyor belts, blowers, baffle plates, and the like. Conventional motor(s) is (are) suitable.

It is to be understood that the general perspective of relative length of a typical embodiment can be determined by reference to FIG. 1, but that the dimensions are not necessarily the same as those illustrated in FIG. 1 or in any of the other figures. Accordingly, the length of any particular conveyor belt system may vary from a few inches up to 20 or 25 yards, for example and similarly the width of any one or more of the conveyor belts or conveyor belt systems and/or of the transverse baffle plates may vary from a few inches (such as four or five inches) up to 2,3, or 25 yards or the like. The particular dimensions, motors, surfaces and such may be varied, altered, or changed within the skill of an ordinary engineer in this field.

Although there may be separately closable flaps, traps, or the like to close-off the baffle(s), typically the baffles when withdrawn to a predetermined degree beneath the movable upper surface(s) of the landing strip(s) preferably automatically switch-off the respective blower(s) and/or shunt the air currents to an ineffective direction, —i.e., thereby in effect closing the baffle(s).

Accordingly, it is within the scope of this invention to make such modifications, substitutions, alterations, and the like as would be apparent to a person having ordinary skill in this field.

What is claimed is:

1. An airplane landing-strip device comprising in a combination facilitatable of airplane take-offs and landings: a revolvable turntable means having an upper face thereof defining a substantially horizontal plane, said turntable means being mounted within an intersection of a plurality of landing strips diverging in different directions from adjacent the upper face of said turntable means, said upper face being movable in a continuous movement in a predetermined direction substantially along said plane at least at one predetermined rate of speed, speed means to move said face at said predetermined speed, revolving means for revolving said turntable intermittently at predetermined times, said predetermined direction being substantially parallel with said plane and said predetermined direction being lineally alignable at said intermittently predetermined times with at least one of said landing strips, and blower means for inducing air currents in about said aligned direction, said blower means including a plurality of blowers located serially along said aligned predetermined direction and the blowers being variable from one another and being settable such that in moving from one end to the other end of said aligned upper face the air currents range from high velocities to low velocities between said one end and said other end, said upper face including a plurality of consecutive ones of said conveyor belts along said aligned predetermined direction and said plurality are each movable at speeds variable from one-another and are each settable such that between one end to the other end of said aligned upper face the upper face's speed ranges from a high speed to a low speed, said blowers located along said aligned predetermined direction being variable from one-another and settable such that in moving from said one end to said other end of said aligned upper face the air currents range from high velocities to low velocities between said one end and said other end, said blowers being variable in direction from about a horizontal to about uprightly and from about said aligned direction each of leftwardly up to about 90° and rightwardly up to about 90°, said blower means including a series of openable and closable baffles with the individual baffles extending about cross-ways to said aligned direction, between said consecutive ones of said conveyor belts and with said series extending about parallel to said aligned direction, and baffles of said series being settable to automatically close consecutively along said series in a closing action beginning at about said one end and terminating at about said other end, and said baffles of said series being settable to automatically open consecutively along said series in an opening action beginning at about said other end and lastly opening at about said one end, said air current being directed substantially through said baffles when open and said air current being substantially terminated when said baffles are closed.

2. An airplane landing-strip device according to claim 1, in which said baffles include first baffles variable in elevation of direction of air currents and second baffles variable to sideward directions of air currents.

3. An airplane landing-strip device comprising in a combination facilitatable of airplane take-offs and landings: a revolvable turntable means having an upper face thereof defining a substantially horizontal plane, said turntable means being mounted within an intersection of a plurality of landing strips diverging in different directions from adjacent the upper face of said turntable means, said upper face being movable in a continuous movement in a predetermined direction substantially along said plane at least at one predetermined rate of speed, speed means to move said face at said predetermined speed, revolving means for revolving said turntable intermittently at predetermined times, said predetermined direction being substantially parallel with said plane and said predetermined direction being lineally alignable at said intermittently predetermined times with at least one of said landing strips, and blower means for inducing air currents in about said aligned direction, said blower means including a plurality of blowers located serially along said aligned predetermined direction and the blowers being variable from one another and being settable such that in moving from one end to the other end of said aligned upper face the air currents range from high velocities to low velocities between said one end and said other end, and a series of openable and closable baffles with the individual baffles extending about cross-ways to said aligned direction and with said series extending about parallel to said aligned direction, and said series being settable to automatically close consecutively along said series in a closing action beginning at about one end of said aligned upper face and terminating at about the other end of said aligned upper face, and said series being settable to automatically open consecutively along said series in an opening action beginning at about said other end and lastly opening at about said one end, said air currents being substantially terminated when said baffles are closed, said turntable being lockable when said predetermined direction is aligned with at least one of said landing strips.

4. An airplane landing-strip device according to claim 3, in which said baffles include first baffles variable in elevation of direction of air currents and second baffles variable to sideward directions of air currents.

5. An airplane landing-strip device comprising in a combination facilitatable of airplane take-off and landings: a revolvable turntable means having an upper face thereof defining a substantially horizontal plane, said turntable means being mounted within an intersection of a plurality of landing strips diverging in different directions from adjacent the upper face of said turntable means, said upper face being movable in a continuous movement in a predetermined direction substantially along said plane at least at one predetermined rate of speed, speed means to move said face at said predetermined speed, revolving means for revolving said turntable intermittently at predetermined times, said predetermined direction being substantially parallel with said plane and said predetermined direction of movement being lineally alignable at said intermittently predetermined times with at least one of said landing strips, and blower means for inducing air currents along detachable curtain means and against airplane lift surfaces, and including detachable curtain means attachable between said upper surface and at least wing sections of an aircraft locatable over said upper face such that air currents directed by said curtain means against lift surfaces of said airplane are facilitatable in said aircraft becoming airborne.

* * * * *